United States Patent [19]
Reboux

[11] Patent Number: 5,141,180
[45] Date of Patent: Aug. 25, 1992

[54] SATELLITE ATTITUDE CONTROL SYSTEM USING A SUPERCONDUCTING MAGNETIC LOOP

[75] Inventor: Alain Reboux, Fayence, France

[73] Assignee: Societe Nationale Industrielle et Aerospatiale, Paris, France

[21] Appl. No.: 542,140

[22] Filed: Jun. 22, 1990

[30] Foreign Application Priority Data

Jun. 23, 1989 [FR] France .................. 89 08416

[51] Int. Cl.$^5$ ............................ B64G 1/24
[52] U.S. Cl. ....................... 244/166; 244/173; 505/1
[58] Field of Search .......... 244/63, 166, 173; 505/1, 903, 911; 335/216

[56] References Cited

U.S. PATENT DOCUMENTS

| 3,390,848 | 7/1968 | Crocker et al. |
| 4,034,941 | 7/1977 | Godet .................. 244/166 |
| 4,939,976 | 7/1990 | Minovitch ............ 244/63 X |
| 5,017,549 | 5/1991 | Robertson ............ 244/63 X |

FOREIGN PATENT DOCUMENTS

| 295978 | 12/1988 | European Pat. Off. |
| 2048666 | 5/1972 | Fed. Rep. of Germany ...... 244/166 |
| 470288 | 3/1969 | Switzerland . |

*Primary Examiner*—Jesus D. Sotelo
*Assistant Examiner*—Carla Mattix
*Attorney, Agent, or Firm*—Browdy and Neimark

[57] ABSTRACT

A satellite comprising a deployable solar generator that can be oriented relative to the satellite body is kept facing the sun at all times. It includes an attitude stabilization device comprising a superconductive material closed loop carried by a support coupled to the solar generator and disposed on a side of the support facing substantailly away from the sun. A secondary loop parallel to the closed loop is substantially the same shape and size as the closed loop, and is carried by the support near the loop. A resistive circuit is carried by the support near at least part of the closed loop. A selective electrical power supply circuit is connected electrically to the secondary loop and to the resistive circuit.

10 Claims, 1 Drawing Sheet

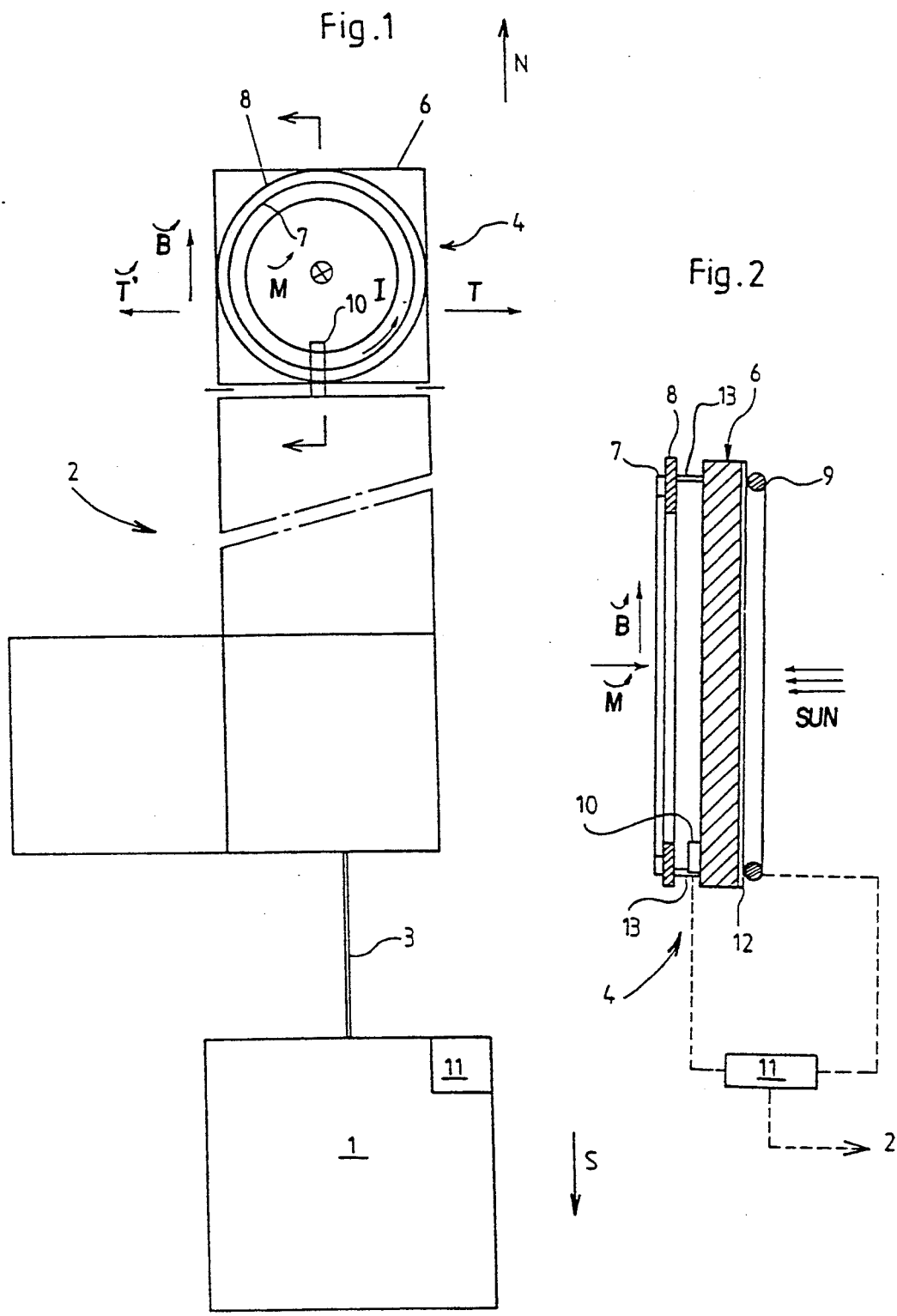

SATELLITE ATTITUDE CONTROL SYSTEM USING A SUPERCONDUCTING MAGNETIC LOOP

BACKGROUND OF THE INVENTION

1. Field of the Invention

The invention concerns a satellite attitude control and stabilization system.

2. Description of the Prior Art

A satellite in any orbit is subject to slowly varying external disturbance torques related to its environment, the major causes of which are:
atmospheric drag (especially in low orbits),
solar radiation pressure,
the terrestrial gravity gradient,
the terrestrial magnetic field.

These torques generally appear because the satellite is not symmetrical in terms of its mechanical design or geometry or the mechanical or optical properties of the materials used.

In the case of a spin-stabilized satellite the action of such disturbances is retarded by the gyroscopic stiffness resulting from the rotation of the satellite body.

In the case of a three-axis stabilized satellite this stiffness is usually created artificially by means of momentum wheels. The effect of external torques—variation of the kinetic moment vector—can be cancelled out by controlling the speed of the wheels in an appropriate way (to create a speed differential). When the limiting speed is reached the wheels are "desaturated" (differential speed) using attitude control actuators: usually thrusters, solar sails or magnetic coils.

The main disadvantage of using thrusters is that this causes sudden changes in attitude which take a long time to be damped out and interrupt the mission, which is especially irksome in the case of terrestrial observation.

Use of magnetic coils allows continuous compensation. However, the low value of the magnetic field (approximately $10^{-7}$ Tesla) and the magnitude of the torques to be compensated ($10^{-5}$ to $10^{-4}$ Nm depending on the asymmetry of the satellite) yield typical performance requirements of 100 to 1,000 ampere-turns.m$^2$ and therefore high magnetic coil masses (10 to 20 kg or even higher). The use of magnetic coils is therefore usually limited to control with respect to a single axis of the satellite, for desaturation of the momentum wheels.

Some satellite configurations have a high degree of asymmetry. For example, many terrestrial observation missions require cooling of the focal plane of the infra red instruments to achieve satisfactory performance at IR (infra red) wavelengths. The temperatures required (<100° K.) are usually achieved by means of passive radiators situated on the North or South face of the satellite not facing towards the sun (assuming a geostationary orbit).

In the case of three-axis stabilization, these faces are usually employed to mount the two wings of an orientable solar generator. Appendages like these are incompatible with correct operation of a passive radiator, which requires a totally unobstructed "field of view" of the coldness of space.

This results in the use, for example, of an asymmetric configuration with a single-wing solar generator mounted on the face opposite the radiator(s). Compensating the high solar radiation pressure torque which this arrangement causes generally requires the installation of a "solar sail" at the end of a long boom, on the face opposite the solar generator wing. The magnitude (approximately $10^{-4}$ Nm) and the orientation of this torque mean that magnetic coils are not well suited to this application.

Apart from its high mass, this solution has the following disadvantages:
reduced performance of the cooling system since the sail is necessarily in the latter's "field of view",
the deployment of the sail constitutes a single failure point, which is to be avoided for reasons of reliability,
the impossibility of modulating the torque created in opposition to the solar radiation pressure torque, although the latter is subject to seasonal variation (due to the inclination of the plane of the terrestrial orbit).

The invention is directed to alleviating the aforementioned disadvantages by proposing a satellite carrying a solar generator and equipped with an attitude compensation device which is light in weight, reliable, compact and economical in terms of energy use and which is adapted to attenuate effectively disturbing torques, in particular those due to solar radiation pressure.

SUMMARY OF THE INVENTION

The invention consists in a satellite comprising a deployable solar generator that can be oriented relative to the satellite body and is adapted to be kept facing the sun at all times and an attitude stabilization device comprising at least:
a superconductive material closed loop carried by a support coupled to the solar generator and disposed on a side of said support facing substantially away from the sun;
a secondary loop parallel to the closed loop with substantially the same shape and size as the closed loop, carried by said support near said loop;
a resistive circuit carried by said support near at least part of the closed loop; and
a selective electrical power supply circuit connected electrically to the secondary loop and to the resistive circuit.

According to preferred features of the invention:
the superconductive material closed loop is in a plane parallel to the solar generator panels;
the support is either an additional panel coupled mechanically to the solar generator or a panel of the latter (carrying solar cells);
the additional panel is articulated to the end of the solar generator farthest from the satellite body;
the superconductive material loop is formed by a substantially circular strip or by a thin-layer deposit of superconductive material on a substrate, or the like;
the closed loop is carried by a frame coupled mechanically to the support by thermally insulative material means;
the secondary loop is disposed on the support opposite this loop;
the resistive circuit and the secondary loop are supplied with electrical power by the solar generator;
the solar generator is highly asymmetric, for example having only one wing.

The solution proposed by the invention therefore relies on:
the use of a current loop installed on the wing of the solar generator and interacting with the terrestrial magnetic field to create a torque substantially equal and opposite to the solar radiation pressure torque, and installation of this circuit on the "shadow" side (the side not exposed to solar radiation) of the solar generator (solar panel or one of its appendages) and at an appropriate distance from the satellite body so as to obtain a temperature compatible with the use of superconductive materials to carry the current.

The attitude stabilization device essentially comprises:

a superconductive material, for example $YBa_2Cu_3O_7$, $Bi_2Sr_2Ca_2Cu_3O_{10}$ or $Bi_2Sr_2CaCu_9O_8$, current loop having a critical temperature compatible with the temperature imposed by the proximity of the surrounding components (solar generator, satellite body); the characteristics of this loop are such that its magnetic moment interacts with the terrestrial magnetic field to create a torque substantially equal and opposite to the solar radiation pressure torque exerted on the satellite; the circuit can have any external shape and cross-section provided that the above condition is at least approximately complied with;

a support receiving in addition to the aforementioned superconductive circuit a resistive circuit of a conventional resistive material (nickel-chromium, graphite or otherwise) adapted to procure limited duration heating of at least part of the superconductive loop (one minute to a few minutes) of the first circuit, causing it to change to a non-superconductive state;

an auxiliary current loop of conventional conductive material (an aluminum or other coil, for example) near and adapted to be structurally coupled to the above loop and circuit; this auxiliary current loop is adapted:

to initialize the current in the superconductive loop,
to be substituted for the main loop should this fail.

The characteristics of the auxiliary loop are such that it can generate a magnetic flux equal to that required in the main loop under nominal conditions, these conditions being obtained by "transfer" from one loop to the other (conservation of magnetic flux). The heat dissipation due to this circuit must be compatible with the temperature requirements of the main loop.

The entire device may be installed on a solar panel of the solar generator or on an appendage of the latter.

In a configuration in which the solar generator is stowed the device may be inboard of the solar generator or outboard (on the space side). The former solution has the advantage of enabling the solar generator to be operated in the transfer orbit without deploying it.

The main operations comprise, in succession:

1. Complete deployment of the solar generator in orbit. The device stabilizes thermally at a temperature corresponding to a superconductive state.
2. The superconductive loop is heated to cause a transition to the non-superconductive state ($T>Tc$).
3. The auxiliary loop is energized so as to generate the nominal flux in the device. The power required for this initialization is provided by the solar generator, as is that needed for the heating.
4. The heating is stopped.
5. The energization of the auxiliary loop is stopped.
6. The superconductive loop operates under nominal conditions, the torque produced substantially balancing out the solar radiation pressure torque.
7. The auxiliary loop is energized in a controlled way to balance seasonal variations in the solar radiation pressure (there may be a plurality of superconductive loops and a plurality of auxiliary loops of which a variable number is active at any given time).

Objects, characteristics and advantages of the invention will emerge from the following description given by way of non-limiting example only with reference to the appended diagrammatic drawings.

BRIEF DESCRIPTION OF THE DRAWINGS

FIG. 1 is a schematic view of a satellite in accordance with the invention comprising a superconductive loop for attitude stabilization. The solar generator is seen from the back.

FIG. 2 is a view in cross-section on the line 2—2 in FIG. 1 of the attitude stabilization device from FIG. 1.

DETAILED DESCRIPTION OF THE INVENTION

FIG. 1 shows a typical configuration of a satellite in accordance with the invention.

It primarily comprises a satellite body 1 equipped with a solar generator 2 that can be deployed from a stowed configuration (launch phase) to a service configuration in which it is connected to the body 1 by a boom 3. The solar generator can be oriented relative to the satellite body and is made to face towards the sun at all times by known conventional means.

The satellite further comprises an attitude stabilization device 4 carried by the solar generator.

In the example considered here the satellite is in geostationary orbit and has an asymmetric configuration (solar generator with only one wing oriented towards the North) giving rise to a disturbing torque $\vec{T}$ due to the solar radiation pressure on the solar generator. A mean value for the modulus T of the torque $\vec{T}$ in the order of $10^{-4}$ Nm will be assumed hereinafter.

The magnetic moment $\vec{M}$ needed to generate a compensating torque $\vec{T}'$, of a sense opposite to the sense of $\vec{T}$ but having a same modulus T, has a modulus M given by $M=T/B$, that is approximately 1,000 ampereturns.m$^2$ assuming that the value of the modulus B of the terrestrial magnetic field at this position in space is in the order of $10^{-7}$ Tesla.

The typical dimensions of the solar generator considered here (length 5 to 10 m, width 1 to 2.5 m) and the stowage constraints during launching of the satellite make it possible in practise to install the compensation loop 4 on a panel of the solar generator or, as here, on an additional panel typically 1.5 meters square. Here this additional panel is articulated to the free end of the solar generator in the same way as the other panels.

The additional panel carrying the compensation system 4 comprises a support panel 6, a superconductive closed loop 7, a support frame 8, an auxiliary loop 9, a resistive circuit 10 and a control circuit 11.

The support panel 6 can be made from a composite material ("NOMEX" type glassfiber "Nida" sandwich with carbon plates, for example); it would typically be about 1.5 cm thick for the specified lateral dimensions.

This panel is coated with a high-reflectivity material 12 (SSM—Secondary Surface Mirror or OSR—Optical Surface Reflector) on the side exposed to the solar radiation, to minimize the temperature.

The closed loop 7 is made from $YBa_2Cu_3O_7$ superconductive material and forms the main current loop of the compensation device. Other superconductive materials are equally feasible: $Bi_2Sr_2CaCu_2O_8$, $Th_2Ba_2CaCu_2O_8$, $Bi_2Sr_2Ca_2Cu_2O_{10}$, etc. In this instance it has a circular external shape corresponding to use of the material in strip form. Other shapes are equally feasible (rectangular with rounded corners to favor high current densities, etc) in the case where the superconductive material is deposited in a thin layer on a substrate.

Typical dimensions for the strip are:
loop outside diameter: approximately 1.5 m,
width: approximately 1 cm,
thickness: approximately 10 to 100 μm.

These values allow for current densities of $10^4$ to $10^5$ amperes/cm$^2$ and are therefore compatible with the current needed to obtain the required magnetic moment, in this instance:

$$I = 1,000 \text{ A m}^2/\pi(1.5/4)^2 = \text{approx. } 600 \text{ A}$$

The frame 8 supports the previously described circuit and is "ring" shaped. Like the panel 6, this frame may be made from a composite material and it is appropriately coated in order to maintain the temperature of the loop 7 at a value corresponding to its superconductive state (here in the order of 75° K., allowing an adequate margin). To this end black paint is used on the side towards the loop 7 and a multilayer thermally insulative coating on the other side (towards the panel 6).

The frame 8 is coupled mechanically to the support panel 6 by means of supports 13 made from a material with a very low thermal conductivity (carbon fiber, for example) and with a height sufficient to provide adequate separation between the panel 6 and the frame 8 (typically 10 cm).

The auxiliary circuit 9 is made from a conductive material (aluminum, for example); it is adapted to initialize the current in the main loop 7. Its outside dimensions are substantially the same as those of the loop (comparable circuit cross-sections, comparable diameters) and it is installed on the opposite side (exposed to the sun) to minimize thermal impact on the loop 7 when it is in the superconductive state and current is flowing in the loop 9.

This auxiliary loop or circuit is in practise a coil with turns parallel to the loop 7.

When the system is initialized the auxiliary loop 9 is energized by the solar generator (by a control device on board the satellite) for the necessary time (in the order of a few minutes) to complete the initialization operations. The current that has to flow is such that the flux induced in the main loop 7 corresponds to the current required in this loop. Given the high coupling between the two loops a comparable value in ampere-turns divided between n current turns is required, approximately 600 ampere-turns here.

The number of turns n is such that the voltage across the circuit 9 is at most equal to that supplied to the satellite by the solar generator. With a voltage of around 50 V, for example, there would be around 100 to 200 turns with a cross-section in the order of 1 mm$^2$.

The method described here of initializing the loop 7 using an auxiliary loop D is in no way limiting. Other devices are feasible, for example devices relying on direct injection of current into the loop 7 using a superconductive switch.

The circuit 10 is adapted to heat the loop 7 locally to cancel its superconductive properties when necessary. This circuit is formed by a resistor with a length of a few centimeters made from a resistive material (Nickel-Chromium or Graphite, for example) and energized by the solar generator.

The control circuit 11 schematically represented is connected to the electrical part of the solar generator (or batteries), to the auxiliary loop 9 and to the resistive circuit 10. It switches the electrical supply to the components 9 and 10 on and off.

The operation of the system as a whole is as previously described.

The compensation torque may be modulated to compensate for seasonal variations in the solar radiation pressure torque (in the order of 10% because of the 23.5° inclination of the terrestrial orbit) or any other form of disturbance in the following way:

by on/off control of operation of the loop 7: the loop 7 is rated to compensate for the maximum value of the disturbing torque and its operation is interrupted periodically in accordance with a predetermined control law (or a control law determined on board or on the ground) to track variations in the disturbing torque; there is no limit as to the number of interruptions/reinitializations;

by a device controlling the total magnetic moment of the system previously described;

by using a secondary loop decoupled from the previous ones, the current in which is controlled in accordance with seasonal or other variations only;

by using multiple independent systems 4, advantageously with different power ratings; by choosing appropriately the system(s) activated at a given time it is possible to vary the total compensator torque and to track in steps variations in the disturbing torque (for example, there might be three systems of which two have lower power ratings than the first).

It goes without saying that the foregoing description has been given by way of non-limiting example only and that numerous variations may be put forward by those skilled in the art without departing from the scope of the invention.

I claim:

1. Satellite comprising a deployable solar generator comprising solar generator panels that can be oriented relative to a satellite body and is adapted to be kept facing the sun at all times and an attitude stabilization device comprising at least:
   a superconductive material closed loop carried by a support coupled to the solar generator and disposed on a side of said support adapted to face substantially away from the sun;
   a secondary loop parallel to said closed loop with substantially the same shape and size as said closed loop, carried by said support near said closed loop.
   a resistive circuit carried by said support near at least part of said closed loop; and
   a selective electrical power supply circuit connected electrically to said secondary loop and to said resistive circuit.

2. Satellite according to claim 1 wherein said superconductive material closed loop is in a plane parallel to said solar generator panels.

3. Satellite according to claim 1, wherein said support is an additional panel coupled mechanically to said solar generator.

4. Satellite according to claim 3 wherein said additional panel is articulated to the end of said solar generator farthest from said satellite body.

5. Satellite according to claim 1 wherein said superconductive material loop is formed by a substantially circular strip.

6. Satellite according to claim 1 wherein said superconductive material loop is formed by a thin-layer deposit of superconductive material on a substrate.

7. Satellite according to claim 1 wherein said closed loop is carried by a frame coupled mechanically to said support by thermally insulative material means.

8. Satellite according to claim 1 wherein said secondary loop is disposed on said support opposite said closed loop.

9. Satellite according to claim 1 wherein said resistive circuit and said secondary loop are supplied with electrical power by said solar generator.

10. Satellite according to claim 1 wherein said solar generator has only one wing.

* * * * *

UNITED STATES PATENT AND TRADEMARK OFFICE
CERTIFICATE OF CORRECTION

PATENT NO. : 5,141,180
DATED : Aug. 25, 1992
INVENTOR(S) : Alain REBOUX

It is certified that error appears in the above-identified patent and that said Letters Patent is hereby corrected as shown below:

On title page, item [73], delete "Societe Nationale Industrielle et Aerospatiale" and insert therefore --AEROSPATIALE SOCIETE NATIONALE INDUSTRIELLE--

Signed and Sealed this

Sixteenth Day of November, 1993

Attest:

BRUCE LEHMAN

Attesting Officer

Commissioner of Patents and Trademarks